United States Patent

Jennings

[15] 3,646,697
[45] Mar. 7, 1972

[54] FISH ALARM

[72] Inventor: George H. Jennings, 4821 North LaSena, Baldwin Park, Calif. 91706

[22] Filed: July 6, 1970

[21] Appl. No.: 52,576

[52] U.S. Cl. .................................................43/17, 43/21.2
[51] Int. Cl. .......................................................A01k 97/12
[58] Field of Search ..........................43/17, 16, 21.2; 248/38

[56] References Cited

UNITED STATES PATENTS 3,359,672  12/1967  Schwartz et al. ............................43/17
3,473,250  10/1969  Leckell ......................................43/17

*Primary Examiner*—Warner H. Camp
*Attorney*—Boniard I. Brown

[57] ABSTRACT

A fishing accessory includes an outer tubular body pivotally mounting an inner spring biased tubular socket having an open upper end projecting through an open upper end of the body to receive the handle of the fishing rod in a manner such that a tug on the fishing line tends to rotate the socket from its normal position against the spring bias on the socket. The body contains an electrical signalling circuit for signalling this rotation of the socket from normal position to alert the fisherman of a fish bite. The disclosed inventive embodiment has a ground stake removably attached to the body for supporting the latter in a generally upright fishing position.

12 Claims, 5 Drawing Figures

PATENTED MAR 7 1972
3,646,697
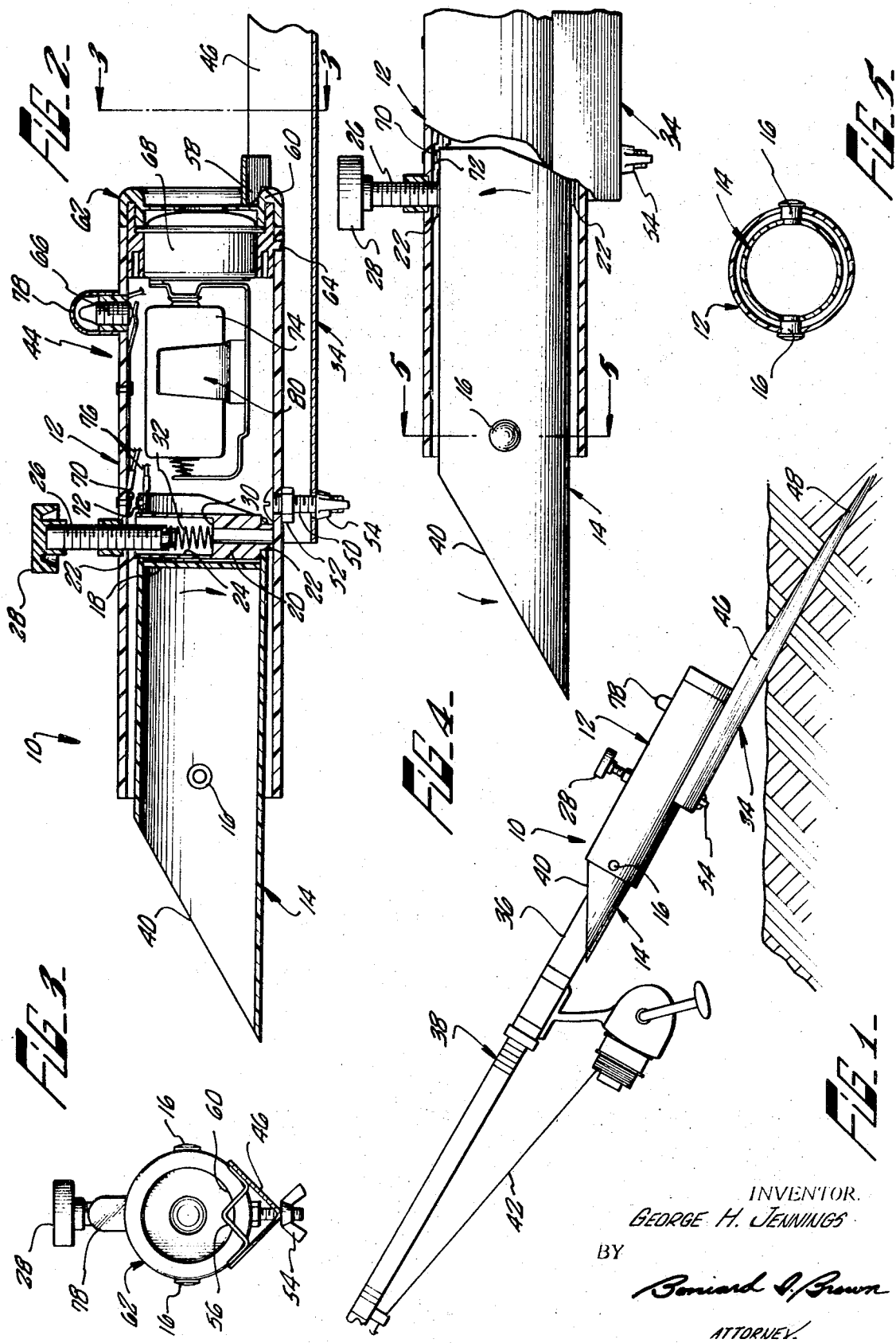
INVENTOR.
GEORGE H. JENNINGS
BY
Bernard J. Brown
ATTORNEY

FISH ALARM

BACKGROUND OF THE INVENTION

1. Field of the Invention

This invention relates generally to fishing equipment and more particularly to a fishing accessory for holding a fishing rod and signalling a bite on the fishing line.

2. Discussion of the Prior Art

Fishing is an extremely popular sport which is characterized by a constant demand for new fishing aids and accessories of all kinds. One such accessory which appeals to many fisherman is a fishing rod holder which both supports the fishing rod, thus relieving the fisherman of the tedious task of holding the rod while he waits for a strike, and signals a fish strike or bite on the fishing line. A variety of such fishing rod holders have been devised. Representative holders of this kind, for example, are disclosed in U.S. Pat. Nos. 3,012,354; 3,156,997 and 3,473,250.

SUMMARY OF THE INVENTION

The present invention provides an improved fishing rod holder of the class described. This holder includes an outer tubular body pivotally mounting an inner spring-biased tubular socket having an open upper end projecting through an open upper end of the body to receive the handle of the fishing rod in a manner such that a tug on the fishing line tends to rotate the socket from its normal position against the spring bias on the socket. The body contains an electrical signalling circuit for signalling this rotation of the socket from normal position to alert the fisherman of a fish bite. The disclosed inventive embodiment has a ground stake removably attached to the body for supporting the latter in a generally upright fishing position.

According to one feature of the invention, the open upper end of the holder socket is beveled to facilitate insertion of the fishing rod handle into the socket. Another feature of the invention resides in a unique arrangement of the fish strike or bite signalling means which comprises an electrical signalling circuit including a battery holder in the body which is readily accessible for battery replacement by removal of an end cap closing the lower end of the body. The spring bias on the holder socket is adjustable by turning an adjustment screw on the body to adjust the tugging force which must be exerted on the fishing line to actuate the fish bite signal. Another feature resides in the removability of the holder ground stake from the body. This feature permits the stake to be driven into hard ground by a hammer or the like without the danger of damage to the remainder of the holder.

BRIEF DESCRIPTION OF THE DRAWINGS

FIG. 1 is a side elevation of the present fishing accessory installed in fishing position and supporting a fishing rod;

FIG. 2 is an enlarged longitudinal section through the accessory;

FIG. 3 is a section taken on line 3—3 in FIG. 2;

FIG. 4 is an enlargement of the upper end of the accessory with parts broken away for clarity; and FIG. 5 is a section taken on line 5—5 in FIG. 4.

DESCRIPTION OF THE PREFERRED EMBODIMENT

The invention provides a fishing accessory 10 including an outer tubular body 12 having an open normally upper end and an inner tubular socket 14 within the body having an open normally upper end projecting through the open upper end of the body. The outer diameter of the socket is less than the inner diameter of the body so that the socket fits quite loosely in the body. Attached, in this case cemented, to opposite sides of the body 12 between its ends are a pair of coaxial pivot pins 16 which are journaled in bores in the body 12 closely adjacent the upper open end of the body. The outer ends of these pins are beaded to locate the socket centrally in the body, as shown in FIG. 5. Pivot pins 16 pivotally connect the socket 14 to the body 12 on a transverse pivot axis of the body and socket.

Extending across the lower inner end of the socket 14 is a water barrier wall 18. This wall may be a disc cemented in place. Behind or below the wall 18 is a member 20, such as a rod or sleeve, which extends diametrically across the socket and has reduced ends 22 fitted within holes in the socket wall. This member is located in the plane of rotation of the socket 14 and has a longitudinal cavity or bore 24 opening axially through the wall of the socket. Bore 24 receives the inner end of an adjustment setscrew 26 threaded in the wall of body 12, on a transverse axis of the body, and having an outer knurled handle 28 by which the screw may be rotated. Positioned between and engaging the inner end of the screw 26 and the bottom wall 30 of bore 24 is a compression spring 32. Spring 32 yieldably urges the socket 14, about its pivot axis, to its normal position of FIGS. 2 and 4. The screw 26 is rotatable to adjust the spring bias on the socket and thereby the force required to rotate the socket from its normal position against the bias of the spring. The screw 26 may be rotated to a fully closed or seated position, thus securing the socket against rotation relative to body 12, when this is desired, as when trolling.

Accessory 10 is equipped with means 34 for supporting the accessory in its generally upright fishing position of FIG. 1. In this position, the holder socket 14 is uppermost and opens upwardly to receive the handle 36 of a fishing rod 38. According to a feature of the invention, the upper outer end of the socket is bevelled at 40, as shown, to facilitate insertion of the handle into the socket and yet provide adequate support for the fishing rod. When the holder and fishing rod are in fishing position, a tug on the fishing line 42 by a fish striking the bait (not shown) tends to rotate the socket 14 on its pivot axis from its normal position of FIGS. 2 and 4 against the bias of spring 32. This socket rotation from normal position involves upward rotation of the lower inner end of the socket, as indicated by the arrow in FIG. 4. Accessory 10 is equipped with signalling means 44 for signalling this rotation of the socket from normal position, as will be explained presently.

The present fishing accessory or fishing rod holder may have various types of support means for supporting the holder in fishing position. For example, the support means might be designed for engagement with a mating part in a boat. In the particular inventive embodiment shown, the support means 34 comprises a ground stake 46 in the form of an angle iron. The lower end of the stake is pointed at 48 so that it may be driven into the ground. The upper end of the stake extends along and cradles one side of the body 12, as shown best in FIGS. 2 and 3. An attachment screw 50 extends through a hole in the body wall and a hole in the upper end of stake 34 and is secured to the body by a nut 52. A wingnut 54 is threaded on the outer end of the screw to releasably secure the upper stake end to the body. Welded to and extending across the channel in the stake 34 below the lower end of the body 12 is a strap 56. This strap is bent and shaped to provide a lug 58 which engages over a lip 60 on the body to releasably secure the stake to the lower end of the body.

In the particular inventive embodiment shown, lip 60 is furnished by an end cap 62 which is removably fitted within the lower end of the body 12. The cap is retained in position by a pin 64 (shown in cross section) and a cooperating angular location slot (not shown) in body 12. Body 12, socket 14, and cap 62 may be constructed of any suitable material but are preferably constructed of a strong plastic material, such as poly vinyl chloride. The ground stake 34 is metal. It is evident from the description to this point and the drawings that the stake is removable from the holder body by removing the wingnut 54. This constitutes an important feature of the invention in that it permits the stake to be pounded into the ground without danger of damage to the remainder of the accessory.

As noted earlier, the accessory 10 is equipped with signalling means 44 for signalling rotation of the socket 14 from its normal position of FIGS. 2 and 4. The particular signalling means illustrated comprises an electrically powered signalling circuit. This circuit includes an alarm lamp 66, an alarm buzzer or bell 68, an electrical switch means in the form of contacts 70, 72 and a battery 74, and conductors 76 electrically connecting the alarms 66, 68, contacts 70, 72, and battery 74 in a manner such that the alarms are energized by engagement of the contacts. Contact 70 is attached to the body 12. Contact 72 is attached to lower inner end of socket 14 so that the contacts are spaced when the socket is in normal position. Rotation of the socket from normal position engages the contact 72 with the contact 70 to energize the alarms. The alarm lamp 66 is threaded in the body 12 and may be enclosed in a small glass or plastic cover 78. Alarm buzzer or bell 68 is fixed within a central opening in the body end cap 62. Battery 74 is mounted within a holder 80 attached to the inner side of the alarm 68 for removal with the end cap 22 from the body 12 to permit replacement of the battery. The wire conductors of the signalling circuit are made long enough to permit this removal.

In use, the ground stake 34 is driven into the ground to support the fishing accessory 10 in its fishing position of FIG. 1. The fishing rod handle 36 is inserted into the holder socket 14. The socket bias spring 32 is adjusted by the screw 26 to the proper tension to maintain the socket in normal position until a fish strikes the bait. This action creates a tug on the fishline 42 which rotates the socket from its normal position to close the contacts 70, 72 and thereby energize the alarms 66, 68. The fishing rod 38 may then be removed from the socket 14 to pull in the fish.

What is claimed as new in support of Letters Patent is:

1. A fishing accessory for holding a fishing rod and signalling a fish bite, comprising:
    an outer tubular body having an open normally upper end,
    an inner tubular socket within said body and having an open normally upper end projecting through said open body end,
    the outer diameter of said socket being less than the inner diameter of said body, whereby said socket fits loosely in the body,
    pivot pins pivotally connecting said body and socket on a transverse pivot axis adjacent said open body end and located between the ends of said socket, whereby said socket is rotatable on said pivot axis relative to said body,
    spring means acting between said body and socket for yieldably urging said socket in one direction about said pivot axis to a normal position relative to said body,
    support means for supporting said body in a generally upright fishing position with said socket uppermost and opening upwardly to receive the handle of a fishing rod in a manner such that a tug on the fishing line of said rod tends to rotate said socket on said pivot axis from said normal socket position against the bias of said spring means, and
    signalling means for signalling rotation of said socket from said normal position.

2. A fishing accessory according to claim 1 wherein:
   the open upper end of said socket is bevelled to facilitate insertion of the fishing rod handle into said socket.

3. A fishing accessory according to claim 1 wherein:
   said spring means comprises an adjustment screw threaded in the wall of said body on a transverse axis intersecting the inner normally lower end of said socket, and a spring engaging between the inner end of said screw and the inner end of said socket; and
   said screw is adjustable to adjust the thrust of said spring against said socket.

4. A fishing accessory according to claim 3 wherein:
   said socket includes a transverse member at said inner socket end having a cavity opening laterally toward and receiving the inner end of said adjustment screw, and
   said spring is positioned within said cavity between the inner end of said screw and the bottom of said cavity.

5. A fishing accessory according to claim 1 wherein:
   said signalling means comprises an electrical signalling circuit including an electrically actuated alarm on said body and electrical switch means actuated by rotation of said socket from normal position for energizing said alarm.

6. A fishing accessory according to claim 5 wherein:
   said switch means comprise electrical contacts on said body and the inner end of said socket which engage upon rotation of said socket from normal position.

7. A fishing accessory according to claim 6 wherein:
   said body includes a removable end cap closing the normally lower end of said body,
   said signalling means includes a battery holder within said body between said end cap and the inner end of said socket, and
   said end cap is removable to place a battery in and remove the battery from said holder.

8. A fishing accessory according to claim 7 wherein:
   said battery holder is attached to said end cap and is removable from said body with said end cap.

9. A fishing accessory according to claim 8 wherein:
   said alarm is carried by said end cap.

10. A fishing accessory according to claim 1 wherein:
    said body support means comprises a ground stake to be driven into the ground, and releasable attachment means securing said stake to said body, whereby said stake may be removed from said body to facilitate driving the stake into the ground.

11. A fishing accessory according to claim 10 wherein:
    the normally upper end of said stake extends along and seats against one side of said body and the normally lower end of said stake extends beyond the lower end of said body, and
    said attachment means comprises a releasable fastener joining said upper stake end to said body and a lug on said stake engaging over an axially projecting lip on the lower end of said body.

12. A fishing accessory according to claim 1 wherein:
    the open upper end of said socket is bevelled to facilitate insertion of the fishing rod handle into said socket,
    said spring means comprises an adjustment screw threaded in the wall of said body on a transverse axis intersecting the inner normally lower end of said socket, and a spring engaging between the inner end of said screw and the inner end of said socket;
    said screw is adjustable to adjust the thrust of said spring against said socket,
    said socket includes a transverse member at said inner socket end having a cavity opening laterally toward and receiving the inner end of said adjustment screw,
    said spring is positioned within said cavity between the inner end of said screw and the bottom of said cavity,
    said signalling means comprises an electrical signalling circuit including an electrically actuated alarm on said body and electrical switch means actuated by rotation of said socket from normal position for energizing said alarm,
    said switch means comprise electrical contacts on said body and the inner end of said socket which engage upon rotation of said socket from normal position,
    said body includes a removable end cap closing the normally lower end of said body,
    said signalling means includes a battery holder within said body between said end cap and the inner end of said socket,
    said end cap is removable to place a battery in and remove the battery from said holder,
    said battery holder is attached to said end cap and is removable from said body with said end cap,
    said alarm is carried by said end cap,
    said body support means comprises a ground stake to be driven into the ground, and releasable attachment means securing said stake to said body, whereby said stake may be removed from said body to facilitate driving the stake into the ground, the normally upper end of said stake extends along and seats against one side of said body and the normally lower end of said stake extends beyond the lower end of said body, and said attachment means comprises a releasable fastener joining said upper stake end to said body and a lug on said stake engaging over an axially projecting lip on the lower end of said end cap.

* * * * *